Sept. 6, 1960  R. C. BUCHAN  2,951,368
APPARATUS FOR METERING AND TRANSFERRING FLUID
Filed Aug. 25, 1958  2 Sheets-Sheet 1

JUST AFTER DISCHARGE

FILLING

INVENTOR.
RUDOLPH C. BUCHAN,
BY John S. Schneider
ATTORNEY.

Sept. 6, 1960 R. C. BUCHAN 2,951,368
APPARATUS FOR METERING AND TRANSFERRING FLUID
Filed Aug. 25, 1958 2 Sheets-Sheet 2

DISCHARGING

INVENTOR.
RUDOLPH C. BUCHAN,
BY John A. Schneider
ATTORNEY.

United States Patent Office 2,951,368
Patented Sept. 6, 1960

2,951,368
APPARATUS FOR METERING AND
TRANSFERRING FLUID
Rudolph C. Buchan, Houston, Tex., assignor, by mesne assignments, to Jersey Production Research Company, Tulsa, Okla., a corporation of Delaware
Filed Aug. 25, 1958, Ser. No. 756,818
2 Claims. (Cl. 73—224)

This invention generally concerns apparatus for measuring and transferring fluids. More particularly, the invention concerns apparatus for metering oil and the transfer thereof; the oil delivered to the meter being at a lower pressure than the oil delivered from the meter.

One phase of oil producing operations concerns accurately metering produced oil at the well site and physically moving the metered oil to a pipe line. These operations are conventionally performed by storing the oil in atmospheric tanks wherein the oil is measured and then pumping the oil from the tanks into the pipe line or gathering system.

Briefly, the invention comprises a metering vessel, a fluid delivery conduit connected to said metering vessel, a gas collection means connected at one end to the delivery conduit upstream of the metering vessel and at the other end to the metering vessel, gas discharge means connected to the metering vessel, fluid inlet means connecting said metering vessel to a source of fluid, and first, second, third, and fourth control means arranged to permit and prevent, respectively, fluid flow through said fluid inlet means, gas flow through said gas discharge means, gas flow from said gas collection means into said said metering vessel and fluid flow between said metering vessel and said delivery conduit, said source of fluid being at a lower pressure than said delivery conduit fluid.

For automatic operation a fluid pressure system is provided which includes first and second liquid level sensing means located in the gas discharge means above the second control means and between the metering vessel and the delivery conduit below the fourth control means, respectively. The first, second, third, and fourth control means are preferably spring-biased diaphragm type valves adapted to actuate in response to fluid pressure signals and the exhaust thereof. These control means are interconnected with the sensing means such that a rising liquid level in a gas-discharge conduit actuates the first sensing means to close the first and second control means and open the third and fourth control means and discharge of liquid from the metering vessel into the delivery conduit actuates the second sensing means to close the third and fourth control means and open the first and second control means.

An object of this invention is to provide apparatus to facilitate metering and transfer of fluid from a source of fluid to a fluid delivery means wherein the fluid source is at lower pressure than the delivery means.

A further object of this invention is to provide apparatus, that may be automatically operated, for metering and transferring fluids without the use of atmospheric tanks and pumps wherein a consistent volume of liquid is measured in each meter fill-discharge cycle.

These and other objects of the invention will be apparent from a more detailed description of the invention taken in conjunction with the drawings wherein.

Referring more particularly to the drawings wherein identical numerals designate identical parts.

Figure 1:
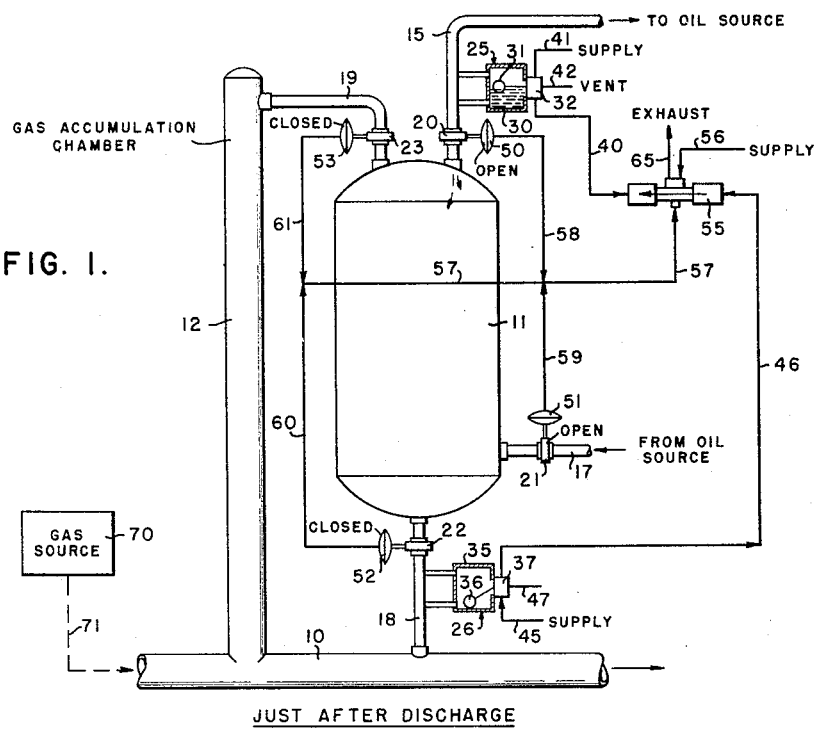
Fig. 1 is a vertical view of the apparatus of the invention showing positioning of the controls just after discharge of the metering vessel.
Figure 2:
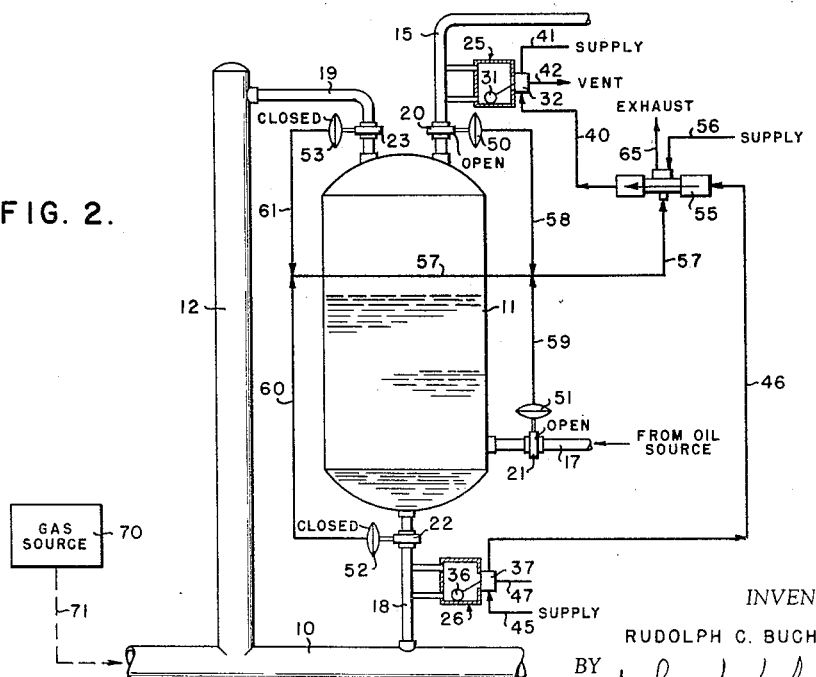
Fig. 2 is a vertical view of the apparatus of the invention showing positioning of the controls as the metering vessel is being filled.
Figure 3:
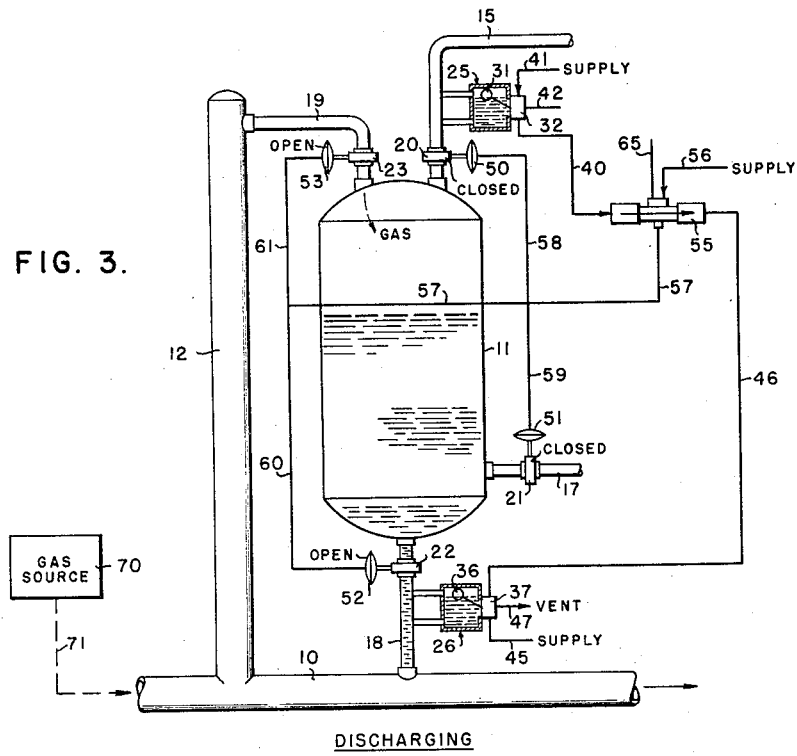
Fig. 3 is a vertical view of the apparatus of the invention showing positioning of the controls as the metering vessel is being discharged.

Figs. 1 through 3 show a pipe line 10, a metering vessel 11, and a vertical riser or gas accumulation chamber 12. Metering vessel 11 has connected thereto a conduit 15 which fluidly communicates the upper end of vessel 11 and the atmosphere; or, if desired, conduit 15 may be connected to the gas zone or space of the container that constitutes an oil source; an inlet conduit 17 which fluidly communicates the interior of metering vessel 11 and the oil source; a liquid discharge conduit 18 which fluidly communicates the lower end of metering vessel 11 and pipe line 10; and a conduit 19 which fluidly communicates the upper end of gas accumulation chamber 12 and the upper end of vessel 11. Conduits 15, 17, 18, and 19 are provided with valves 20, 21, 22, and 23, respectively, which are adapted to permit and prevent fluid flow through these conduits.

A suitable system for automatically controlling operation of these valves is illustrated. A liquid level sensing means 25 fluidly communicates with conduit 15 above valve 20 and a liquid level sensing means 26 fluidly communicates with conduit 18 between pipe line 10 and valve 22. Liquid level sensing means 25 includes a reservoir or chamber 30 in which is arranged a float 31, which is pivotally connected to a valve 32. Similarly liquid level control means 26 includes a chamber 35 in which is arranged a float 36, which is pivotally connected to a valve 37. Float 31 positions valve 32 to fluidly communicate a source of fluid pressure through conduit 41 to conduit 40 when float 31 is in the up position, as seen in Fig. 1, and positions valve 32 to fluidly communicate conduit 40 and vent conduit 42 when float 31 is in the down position, as shown in Fig. 2. Float 36 positions valve 37 to fluidly communicate a source of fluid pressure through conduit 45 to conduit 46 when float 36 is in the down position, as seen in Fig. 1, and positions valve 37 to fluidly communicate conduit 46 and vent conduit 47 when float 36 is in the up position, as seen in Fig. 3.

Valves 20, 21, 22 and 23 are spring-biased diaphragm type valves. Diaphragms 50, 51, 52, and 53 are associated with each of the valves. Valves 20 and 21 close off fluid communication through conduits 15 and 17, respectively, upon application of fluid pressure to diaphragms 50 and 51, respectively, and open fluid communication through conduits 15 and 17, respectively, upon the exhaust of fluid pressure from diaphragms 50 and 51, respectively. Valves 22 and 23 are arranged to function oppositely to the operation of valves 20 and 21. That is, these valves open fluid communication through conduits 18 and 19 by application of a fluid pressure signal to diaphragms 52 and 53, respectively, and close off fluid communication through conduits 18 and 19 by exhaust of pressure from the diaphragms.

The control system includes a pneumatic actuator for controlling the pilot pressure signals. It is of the type shown and described in U.S. patent application Serial No. 670,674, entitled "Actuator," filed July 9, 1957, by Stephen S. Brown. This actuator is designated 55 and it includes a movable valve core which in the left hand position, indicated by the arrow in Fig. 1, fluidly communicates conduit 57 and exhaust conduit 65 and which in the right hand position, indicated by the arrow in Fig. 3, fluidly communicates conduit 57 and a source of fluid pressure via conduit 56. A conduit 58 connects conduit 57 to diaphragm 50; a conduit 59 connects conduit 57 to diaphragm 51; a conduit 60 connects conduit 57 to diaphragm 52; and a conduit 61 connects conduit 57 to diaphragm 53.

If desired, a separate gas source 70 may be utilized to inject gas into the pipe line upstream of the gas accumulation chamber 12 through a conduit 71, as indicated by the dotted lines.

When carrying out the method and where hydrocarbons comprise the fluid to be measured and transferred, the measuring tank 11 is connected to pipe line 10 and vertical riser 12 is connected between pipe line 10 and the measuring vessel 11, as shown. The vessel 11 is designed to withstand the internal pressure of the pipe line. Any measuring or metering tank of conventional design may be employed. The oil source may be a conventional gas-oil separator or a dehydration plant or a surge tank. As an example, the oil source may be at a pressure of about 100 lbs. per square inch and the pipe line pressure may be at a pressure of about 500 lbs. per square inch.

Referring to the figures and assuming that vessel 11 has just discharged its contents into pipe line 10, when the oil has drained through discharge conduit 18, the liquid level in reservoir 35 drops and float 36 accordingly drops to the down position, shown in Fig. 1. This actuates valve 37 to connect conduits 45 and 46 which supplies a fluid pressure signal to actuator 55 which moves the actuator core to the left. In this position of the core, conduit 57 and associated conduits 58, 59, 60, and 61 exhaust through conduit 65 thereby exhausting fluid pressure from diaphragms 50, 51, 52, and 53 which causes valves 20 and 21 to open and valves 22 and 23 to close. Actuator 55 is designed such that the valve core moves to the left even though a fluid pressure signal is being applied to the left hand side of the actuator at the same time. This step is shown in Fig. 1. Upon this occurrence, vessel 11 begins to fill through inlet 17 and liquid in conduit 15 above valve 20 including liquid in reservoir 30 discharges into vessel 11. In response to the latter action, float 31 drops to the down position which actuates valve 32 to exhaust fluid pressure in conduit 40 to vent conduit 42. This step is shown in Fig. 2.

During the filling operation of Fig. 2, the valves are maintained in the position shown in Fig. 1.

When valve 20 is flooded and reservoir 30 fills, the liquid level in reservoir 30 rises which raises float 31 and causes valve 32 to actuate to supply a fluid pressure signal through conduit 41 to conduit 40 and actuator 55. This shifts or moves the valve core to the right, as indicated by the arrow in Fig. 3, which supplies a fluid pressure signal through conduit 56 to conduit 57 and connected conduits 58, 59, 60, and 61 whereby applying a fluid pressure signal to diaphragms 50, 51, 52, and 53, respectively. This causes valves 20 and 21 to close and valves 22 and 23 to open. With the valves in these positions, the oil in vessel 11 drains or discharges by gravity into pipe line 10. When the liquid in vessel 11 has discharged into pipe line 10, float 36 drops to the down position and the cycle is repeated.

Since the pressure in vessel 11 is at a pressure of 100 lbs. per square inch and since the pipe line pressure is 500 lbs. per square inch, the oil in the vessel could not drain by gravity without the provision of the gas accumulation chamber. Thus, gas in the gas accumulation chamber 12 being at the pressure of the pipe line 10 equalizes the pressure between the metering vessel 11 and pipe line 10 and thus permits gravity drainage of vessel 11. When vessel 11 has drained completely the gas contained in vessel 11 is at the pressure of the pipe line when valves 23 and 22 close; however, the gas exhausts through vent conduit 15 when valve 20 opens as vessel 11 begins to fill.

If the volume of gas in the pipe line or the oil gathering system is small, to permit accumulation of gas in gas accumulation chamber 12, a gas can be injected into the system upstream of the riser 12 by means of the gas source 70 and conduit 71.

Preferably valve 20 should open slightly before valve 21 and valve 23 should open slightly before valve 22. Signal speed control means may be arranged in conduits 59 and 60 to effect these operations.

The measuring vessel may be equipped with counters to count the number of times the vessel is filled and emptied and temperature compensators and other devices to obtain accurate volume measurements. This equipment is conventional and has not been shown since it does not constitute a part of the present invention.

The term "liquid" as used herein means essentially a liquid phase with or without entrained or entrapped gas and the term "gas" as used herein means essentially a gas phase with or without some liquid.

Having fully described the operation, objects, and apparatus of my invention, I claim:

1. Apparatus for measuring and transferring fluid comprising a metering vessel, a fluid delivery conduit connected to said metering vessel, a gas collection means connected at one end to said delivery conduit upstream of said metering vessel and at the other end to the upper end of said metering vessel adapted to equalize pressure between the delivery conduit and the metering vessel, gas discharge means connected to the upper end of said metering vessel adapted to discharge gas from said metering vessel when said metering vessel fills, fluid inlet means interconnecting said metering vessel and a source of fluid to be measured and transferred, and first, second, third, and fourth control means arranged to permit and prevent, respectively, fluid flow through said fluid inlet means, gas flow through said gas discharge means, gas flow from said gas collection means into said metering vessel and fluid flow between said metering vessel and said delivery conduit, said source of fluid being at a lower pressure than said delivery conduit fluid.

2. Apparatus for measuring and transferring fluid comprising a metering vessel, a fluid delivery conduit connected to said metering vessel, a gas collection means connected at one end to said delivery conduit upstream of said metering vessel and at the other end to the upper end of said metering vessel adapted to equalize pressure between the delivery conduit and the metering vessel, gas discharge means connected to the upper end of said metering vessel adapted to discharge gas from said metering vessel when said metering vessel fills, fluid inlet means interconnecting said metering vessel and a source of fluid to be measured and transferred, and first, second, third, and fourth control means arranged to permit and prevent, respectively, fluid flow through said fluid inlet means, gas flow through said gas discharge means, gas flow from said gas collection means into said metering vessel and fluid flow between said metering vessel and said delivery conduit, said source of fluid being at a lower pressure than said delivery conduit fluid, said apparatus including a fluid pressure system adapted to afford automatic operation including first and second liquid level sensing means positioned in said gas discharge means above said second control means and between said metering vessel and said delivery conduit below said fourth control means, respectively, said first, second, third, and fourth control means being interconnected with said first and second sensing means such that a rising liquid level in said gas discharge conduit actuates said first sensing means to close said first and second control means and open said third and fourth control means and the completion of discharge of liquid from said metering vessel into said delivery conduit actuates said second sensing means to close said third and fourth control means and to open said first and second control means.

References Cited in the file of this patent

UNITED STATES PATENTS 2,844,029    Leonard                 July 22, 1958